US009229620B2

(12) United States Patent
O'Donoghue et al.

(10) Patent No.: US 9,229,620 B2
(45) Date of Patent: Jan. 5, 2016

(54) SYSTEM AND METHOD FOR MANAGING USER E-BOOK COLLECTIONS

(71) Applicant: Kobo Inc., Toronto (CA)

(72) Inventors: Tony O'Donoghue, Toronto (CA); Sneha Patel, Mississauga (CA); Charles Joseph, Toronto (CA)

(73) Assignee: Kobo Inc., Toronto (CA)

( * ) Notice: Subject to any disclaimer, the term of this patent is extended or adjusted under 35 U.S.C. 154(b) by 207 days.

(21) Appl. No.: 13/889,114

(22) Filed: May 7, 2013

(65) Prior Publication Data

US 2014/0337776 A1    Nov. 13, 2014

(51) Int. Cl.
*G06F 3/048* (2013.01)
*G06F 3/0484* (2013.01)

(52) U.S. Cl.
CPC .................................. *G06F 3/0484* (2013.01)

(58) Field of Classification Search
CPC .... G06F 17/30; G06F 3/0484; H04L 67/2857
See application file for complete search history.

(56) References Cited

U.S. PATENT DOCUMENTS

| | | | | |
|---|---|---|---|---|
| 7,480,896 B2 * | 1/2009 | Harry et al. | | 717/120 |
| 7,856,604 B2 * | 12/2010 | Hooper et al. | | 715/841 |
| 2005/0102610 A1 * | 5/2005 | Jie | | 715/513 |
| 2005/0193374 A1 * | 9/2005 | Harry et al. | | 717/122 |
| 2006/0064716 A1 * | 3/2006 | Sull et al. | | 725/37 |
| 2007/0011702 A1 * | 1/2007 | Vaysman | | 725/45 |
| 2009/0013350 A1 * | 1/2009 | Ohlfs et al. | | 725/39 |
| 2009/0019489 A1 * | 1/2009 | Ohlfs et al. | | 725/44 |
| 2011/0191721 A1 * | 8/2011 | Choi et al. | | 715/838 |
| 2011/0246294 A1 | 10/2011 | Robb et al. | | |
| 2012/0005617 A1 | 1/2012 | Lee et al. | | |
| 2012/0096387 A1 * | 4/2012 | Fu et al. | | 715/772 |
| 2012/0240081 A1 * | 9/2012 | Sim et al. | | 715/811 |
| 2013/0132884 A1 | 5/2013 | Jang et al. | | |
| 2013/0159936 A1 * | 6/2013 | Yamaguchi et al. | | 715/850 |

OTHER PUBLICATIONS

Nook Tablet User Guide, 2012, Barnes & Nobel Inc., Version 1.4.3. A, pp. 69-77, 83-84, 164-165.*

* cited by examiner

*Primary Examiner* — Steven Sax
*Assistant Examiner* — Wilson Varga
(74) *Attorney, Agent, or Firm* — Oblon, McClelland, Maier & Neustadt, L.L.P.

(57) ABSTRACT

Examples described herein enable a user to organize and manage e-books on a computing device that utilizes a network-based e-book service. According to some examples, a user e-book collection can be organized so that it can be displayed when archived, as well as in accordance with user-defined lists.

19 Claims, 7 Drawing Sheets

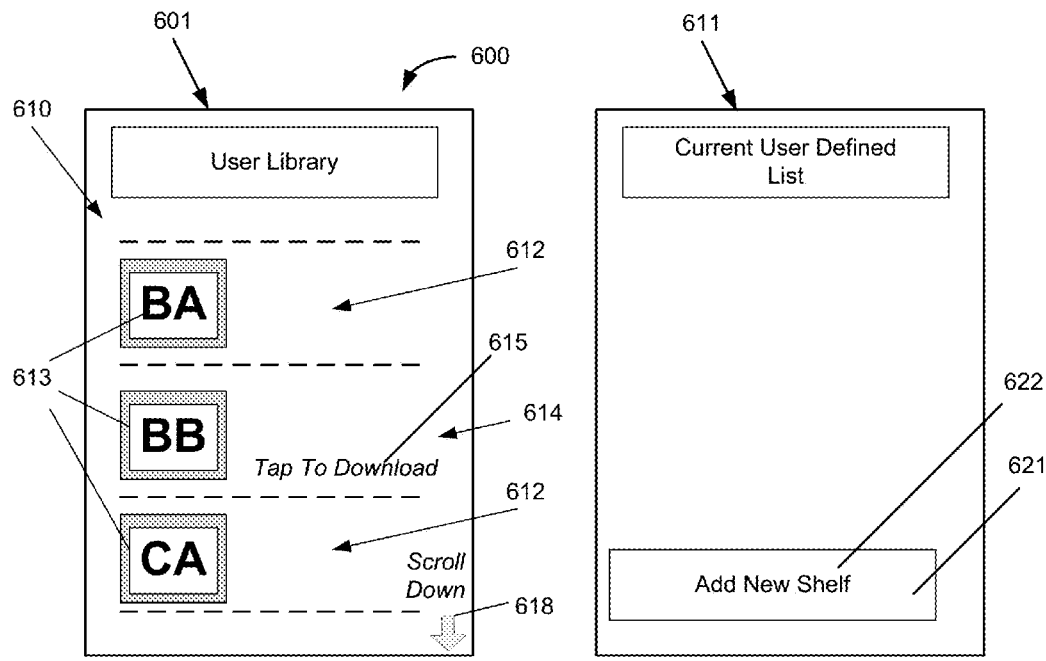
FIG. 6A
FIG. 6B
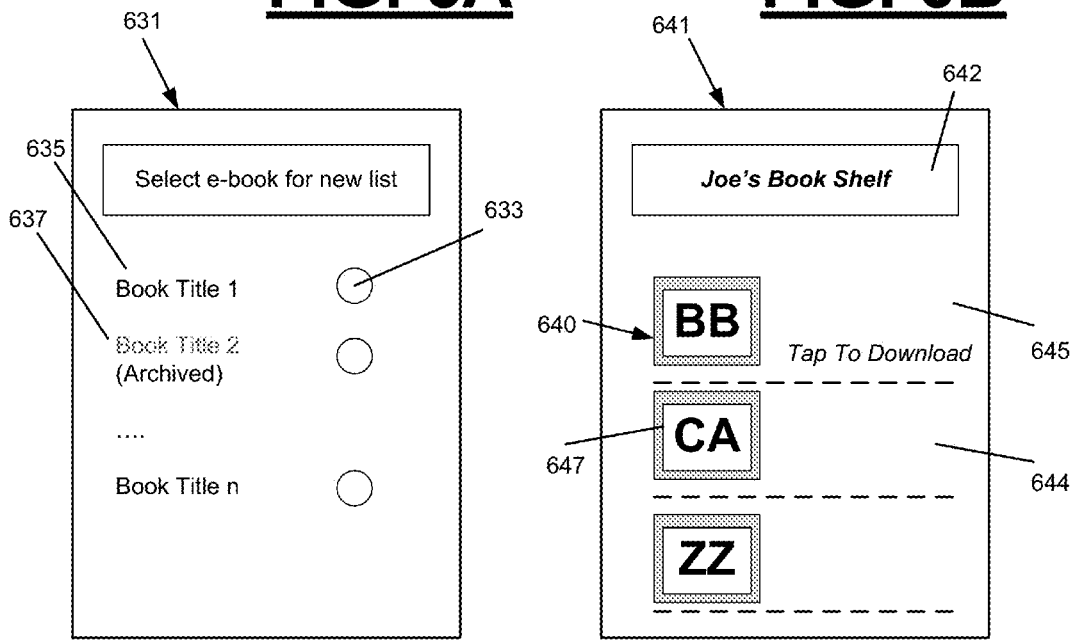
FIG. 6C
FIG. 6D

SYSTEM AND METHOD FOR MANAGING USER E-BOOK COLLECTIONS

TECHNICAL FIELD

Examples described herein relate to a system and method for managing user e-book collections.

BACKGROUND

"E-books" are a form of an electronic publication that can be viewed on computing devices with suitable functionality. Multi-function devices, such as cellular-telephony or messaging devices, can utilize specialized applications (E.g., e-reader apps) to view e-books. Still further, some devices (sometimes labeled as "e-readers") can be centric towards content viewing, and e-book viewing in particular.

BRIEF DESCRIPTION OF THE DRAWINGS

FIG. 6A illustrates an example interface for displaying a library representation for a user's collection of e-books.

FIG. 6B illustrates an interface for enabling the user to create a new user-defined list.

FIG. 6C illustrates an interface for enabling the user to specify entries for a newly created list.

FIG. 6D illustrates an interface for enabling the user to view list content for a newly user-defined list.

DETAILED DESCRIPTION

Figure 1:
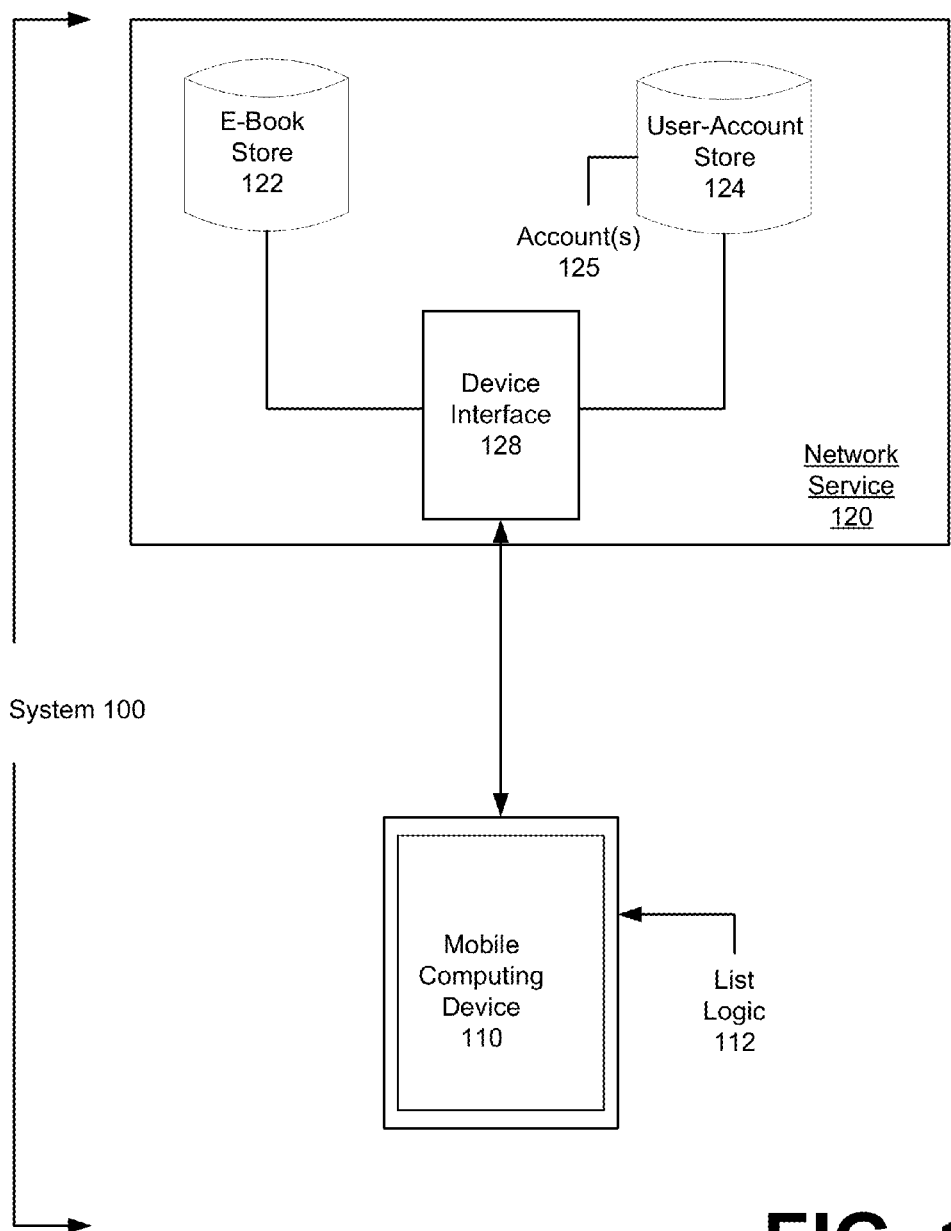
FIG. 1 illustrates an example system for organizing an e-book collection.

Examples described herein provide for a system and method for managing a user's e-book collection. In particular, examples described herein enable a user to organize and manage e-books on a computing device that utilizes a network-based e-book service. According to some examples, a user e-book collection can be organized so that it can be displayed when archived, as well as in accordance with user-defined lists.

In one example, a graphic representation of each e-book in a collection is identified. A user-defined list of e-books is also identified from the collection. A library representation of the collection is displayed on the computing device, where the library representation includes the graphic representation of each e-book in the collection. The user can specify an input that corresponds to the user-defined list. In response to detecting the input, the library representation is filtered to include only the e-books that are part of the corresponding user-defined list. A selected e-book from the collection can be archived by removing the selected e-book from local memory. Additionally, for each archived e-book, the graphic representation of the e-book is altered in the library representation to indicate that the e-book is archived with respect to that computing device.

According to another example, a collection of e-books are identified that are associated with an account of a user. A graphic representation of each e-book in the collection may also be identified. A user-defined list of e-books is defined from the collection. The collection is made available for display on any of multiple computing devices of a user as a library representation. The library representation includes the graphic representation of each e-book in the collection. The user can specify, on any of multiple computing devices, an input that corresponds to the user-defined list. The user-defined list is communicated to each of the multiple computing devices of the user. The user to can separately archive each item that is locally stored on any of the multiple computing devices, so that each device can include a different set of locally stored e-books.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Overview

FIG. 1 illustrates a system for organizing an e-book collection, according to an embodiment. A system 100 includes a mobile computing device 110 and a network service 120. The network service 120 may include multiple servers and other computing resources that provide various e-book services, including services in which e-books are sold, shared, downloaded and/or stored. The mobile computing device 110 can correspond to any computing device on which an e-book can be rendered and consumed. For example, the mobile computing device 110 can correspond to a tablet, telephony/messaging device (e.g., smart phone) or portable computing device. The mobile computing device 110 can run an e-reader application that links the device to the service 120 and enables e-books provided through the service to be viewed and consumed.

In some implementations, the mobile computing device 110 is equipped with hardware and software to optimize reading electronic content, including e-books. For example, the mobile computing device 110 can have a tablet like form factor, although variations are possible. In some cases, the mobile computing device 110 can also have an E-ink display.

The network service 120 can include a device interface 128, which communicates with individual devices that access the service. Among other resources, the network service 120 can include an e-book store 122 and a user account store 124. The user account store 124 can associate mobile computing device 110 with a user and an account 125. The account 125 can also be associated with one or more e-books, which can be stored in the e-book store 122. As described further, the user account store 124 can retain metadata for individual accounts 125 to identify e-books that have been purchased or made available for consumption for a given account. The metadata can include lists that are specific to the user account 125, as well as to one or more devices that are associated with the user account. The mobile computing device 110 may be associated with the user account 125, and multiple devices may be associated with the same account. As described in greater detail below, the mobile computing device 110 can store e-books that are purchased or otherwise made available to the user of the mobile computing device 110, as well as archive e-books that have been purchased for the user account 125, but are not stored on the particular mobile computing device.

In some embodiments, mobile computing device 110 includes list logic 112. The list logic 112 enables the user to select e-books that can be archived with a network service 120. When archived, the local copy on the mobile computing device 110 is deleted, but the network service 120 maintains the association of the archived e-book with the account of the mobile computing device 110. As a result, the archived e-book is available to the user of the mobile computing device 110 for download at a later time. If an archived e-book is one that the user has previously purchased, then the e-book can be made available for download to the mobile computing device 110 at no charge, so that the user maintains ownership of the e-book. The list logic 112 enables the user of the mobile computing device 110 to view their entire collection of e-books, including archived e-books which are not stored on the mobile computing device 110.

Additionally, the list logic 112 can be implemented to enable the user to generate specific user-defined lists. For example, separate lists can be defined for different users that share the same account and/or the mobile computing device 110. Lists provide both archived e-books and downloaded e-books in a manner that enables the user to view his collection or sub-collection, and the individual e-books identified in the particular list can be either locally stored on the device or provided by or with the cloud service.

Figure 2:
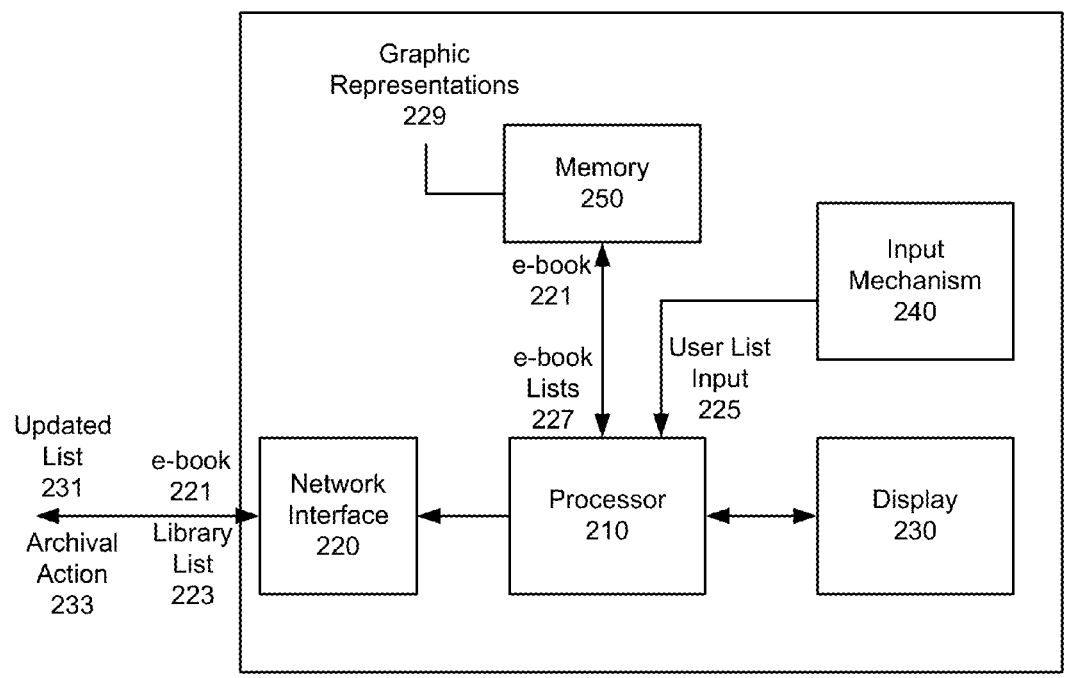
FIG. 2 illustrates an example of a mobile computing device.

FIG. 2 illustrates an example of a mobile computing device, according to an embodiment. The mobile computing device 110 can include a processor 210, a network interface 220, a display 230, one or more input mechanisms 240, and a memory 250. The processor 210 can utilize the network interface 220 to communicate with a network service 120 (see FIG. 1). In communicating with the network service 120, the mobile computing device 110 can receive e-books 221 that the user has purchased or otherwise selected to download from the network service. The account of the mobile computing device 110 may have also been previously associated with one or more library lists 223, including user-defined lists. For example, a given account of the mobile computing device 110 can be associated with multiple devices, and a user-defined list may have been created on another one of the devices and then communicated to the network service 120. The mobile computing device 110 may receive lists 223 on other devices created for the account, as well as default or service generated lists (e.g., "Books you purchased recently").

The e-books 221 that are downloaded onto the mobile computing device 110 may be stored in the memory 250. The library list 223 may also be stored in the memory 250.

In some embodiments, the user may operate the mobile computing device 110 to create user-defined lists. For example, the user may operate input mechanism 240 in order to provide user list input 225. The processor 210 implements logic to generate one or more additional user-defined lists from the user input 225. For example, the user list input 225 can include input to define a new list or input to augment items to an existing list. The input mechanism 240 can correspond to, for example, a touch interface, such as one integrated with the display 230 (e.g., touchscreen). As an addition or alternative, the input mechanism 240 can correspond to a microphone, for which speech recognition logic (e.g., application running on processor 210) can interpret as text input. Still further, the input mechanism 240 can correspond to a set of buttons or switches, including a keyboard or button set, that the user can operate to define a new list, as well as to select items for either a new or existing list.

The display 230 can correspond to, for example, a liquid crystal display (LCD) that illuminates in order to provide content generated from processor 210. In alternative variations, for example, the display 230 can be an E-ink display with a white-paper appearance to enhance readability.

The processor 210 can synchronize the contents of various library list 223 with information maintained in the account associated with the mobile computing device 110. Thus, when a new user-defined list is created on the mobile computing device 110, the processor 210 can communicate, through the network interface 220, the newly created list to the network service 120 (see FIG. 1). The newly created list is associated with the user account, and made available to other devices of that account. Likewise, when the user alters the contents of an existing list, such as augmenting a previously created user-defined list with additional items (e.g., adding new e-books to the bookshelf), the processor 210 can communicate the updated user-defined list 231 to the network service 120, where the list is maintained and distributed to other devices of the same account.

In addition to synchronizing lists, the processor 210 can also perform archival actions 233. For example, when the user selects to archive an e-book, the e-book may be removed from memory 250, and the user's selection to archive the particular e-book is communicated to the network service 120. In some variations, the network service 120 may automatically instruct other devices of the same account to archive the e-book, so that the archived e-book no longer exist in the memory of any of the devices of the particular account.

In some embodiments, the memory 250 can also store graphic representations 229 (e.g. publisher imagery) for each e-book associated with the user account. As described below, the graphic representations 229 may be displayed with the various lists. Moreover, the graphic representations 229 can be modified (e.g., provided indicia) to signify that the user has purchased or otherwise has rights to a particular e-book, even when the e-book has been archived. Thus, for example, a user can, by looking at a virtual bookshelf on his mobile computing device 110, see what books are in his collection, regardless of whether those books are stored locally or archived through network service 120. Additionally, as described below, the graphic representations 229 can be linked to programmatic actions, so as to, for example, trigger an automatic download of a corresponding e-book.

Figure 3:
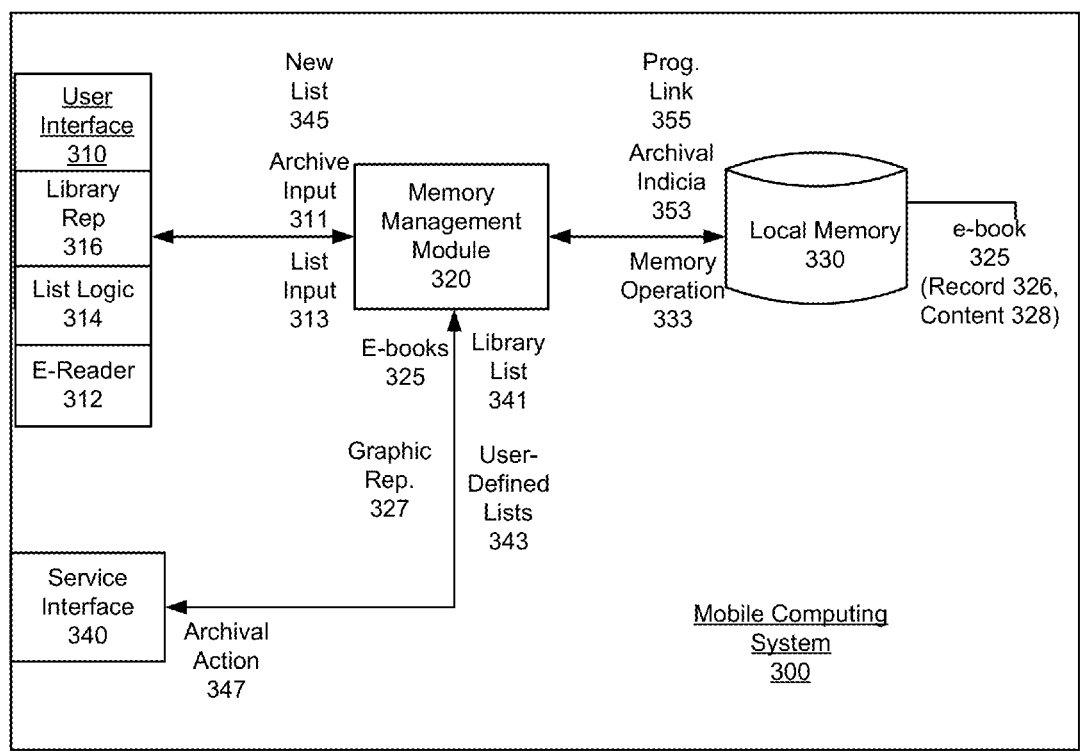
FIG. 3 illustrates an example device system for managing an e-book collection associated with a given mobile computing device.

FIG. 3 illustrates an example device system for organizing an e-book collection associated with a given mobile computing device, according to an embodiment. In reference to FIG. 3, a mobile computing system 300 can implement programmatic components for communicating with an e-book service (such as network service 120, shown in FIG. 1), as well as for enabling organization of e-books utilized by an account of the mobile computing system 300. In some implementations, the mobile computing system 300 can be implemented as an application that runs on a mobile computing device (e.g., such as shown by FIG. 1 or FIG. 2).

In an example of FIG. 3, the mobile computing system 300 includes a user interface 310, a memory management module 320, a local memory 330, and a service interface 340. The programmatic components shown with the computing system 300 can be provided as part of an application that runs on the computing system 300. For example, the user can download an application onto a mobile computing device in order to obtain functionality such as described herein, as well as to communicate with a network service 120. Alternatively, the application can be embedded or otherwise preinstalled with other programmatic elements for providing such functionality on a computing device.

The service interface 340 includes application and logic which enables the device to use, for example, a wireless Internet connection, to connect to the network service 120 (see FIG. 1). In connecting with the service, the service interface 340 can transmit data that enables the network service 120 to identify mobile computing system 300 (or alternatively the user) so that the network service 120 can determine the account associated with the mobile computing device. The service interface 340 can be used to retrieve e-books 325 from the network service 120. For example, in identifying the mobile computing system 300 with the network service 120, the network service may be able to procure payment information (e.g., stored credit card) that can be used to charge users account when purchasing a new e-book. Each e-book can correspond to a literary work, having pagination, chapter designations and optionally graphics and formatting. Individual e-books 325 can also include graphic representations 327, such as icons, that provide imagery for marketing the e-book similar to the manner in which a conventional hardbound book would be marketed in a retail store. In one implementation, the network service 120 can retrieve or otherwise identify the graphic representations 327 of individual e-books from publisher sources.

In identifying the mobile computing system 300, the network service 120 can identify what e-books belong to the account of that device. E-books that are transmitted to the mobile computing system 300 include those that are purchased from the device, or those that the user requested to download. In variations, e-books can automatically be downloaded to the device in response to the occurrence of certain conditions. For example, the user can purchase an e-book on another device, and then subsequently connect to the network service 120 via the mobile computing system 300 to automatically receive their previously purchased e-book. Alternatively, network service 120 can be configured to push e-books to the mobile computing system 300, based on, for example, user account settings, subscription rules, and various other business logic consideration.

Additionally, the service interface 340 can include processes for automatically receiving updates from a network service 120. The updates can include programmatic updates, including updates to existing components on the device, as well as updates to lists, e-books that the user may have purchased on another device of the same account, recommendations from the network as to what a given user may want to purchase or view, and various other data that can be either generally provided to users of the network service 120 and/or specifically provided for the particular account or user.

Among other functionality, the user interface 310 can include an e-reader 312, list logic 314, and a library representation 316. The e-reader 312 can correspond to a program that renders e-books for the user. The e-reader 312 can, for example, display paginated content such as e-books, as well as other content such as electronic magazines and web pages. The e-reader 312 can also provide interface features that enable the user to flip through electronic pages or chapters of an e-book.

The list logic 314 includes functionality for enabling the user to create and modify lists of e-books. In one implementation, service interface 340 can automatically retrieve existing library lists 341 and user-defined lists 343 from the network service 120. The memory management module 320 can store the retrieved lists 341, 343 with the local memory 330. The list logic 314 can display list content based on the retrieved list 341, 343. Additionally, the list logic 314 can enable the user to augment existing list 341, 343, and to also create new user-defined list 345. The new user-defined list 345 can be stored via memory management module 120 in the local memory 330, and also transmitted via the service interface 340 to the network service 120. In turn, the network service 120 can update the user account to reflect changes or additions to the various lists associated with the user account, including to add new user-defined lists generated on the mobile computing system 300, and to update or otherwise augment existing lists that are changed with input made through the user interface 310.

The library representation 316 of the user interface 310 can enable the display of list content, corresponding to the various lists that are associated with the particular user account. In one implementation, the list content includes the entries of each list, displayed in any one of a variety of formats. The individual entries can each include some information about a corresponding e-book, such as title, author, user rating, some textual characterization (e.g. tags re-summary), and status information as to whether the user has read the book or spent time viewing the book. Additionally, each entry of the various lists can include the graphic representation 327 of the corresponding e-book 325. In one implementation, list content can be structured as a vertical list that includes the graphic representation 327 of each e-book 325 identified in the list. In another implementation, some or all of the lists that are maintained for the user can be rendered graphically in the form of a shelf or bookcase. For example, a bookcase can be used to represent the entire collection of the user, and each shelf in the bookcase can correspond to an existing list, such as a user-defined lists Numerous such variations are possible.

The user interface 310 can include various other interactive elements as well. By way of example, user interface 310 can include a store interface, where the user can purchase e-books and browse recommendations etc. The user interface 310 can also include a community interface, where users can share thoughts on books, provide commentary and feedback and/or engage in social networking activity.

According to some embodiments, the user can also operate the user interface 310 to selectively archive e-books that are stored on the device. In particular, downloaded e-books can be locally stored in the memory 330. A user can enter input, or designate settings (e.g., archive after completing reading) by which e-books are selectively removed from local memory 330. The user interface 310 can communicate the archival input 311 to memory management module 320. The memory management 320 can then implement memory operations 333 to delete or otherwise remove the contents of the e-book from memory 330.

According to some embodiments, the local memory 330 stores each e-book 325 as a record 326 that includes content 328 (e.g., page content). The memory operations 333 of the memory management module 320 can archive e-books 325 by maintaining the record 326 of each archived e-book in the local memory 330. However, the memory operation 333 can delete or otherwise remove from memory the contents 328 of an e-book that is archived, corresponding to, for example, some or all of the pages of the e-book that have been selected for removal from the device. The record 326 of each e-book (including archived e-books) can include the data used to represent that e-book in any one of the list maintained for the user on the mobile computing system 300. In one implementation, the data includes the graphic representation 327 for each e-book 325, as well as other metadata that is used to represent the e-book as an entry in one of the lists.

In some implementations, when an e-book 325 is archived on the mobile computing system 300, the entry representing that e-book in the various lists can be altered in some form to indicate the archive status of that e-book. Additionally, the entry of the archive e-book can be linked to some programmatic action 355 that can be selected by the user in order to transfer the e-book from the archives state back to the locally stored state. For example, the record 326 of an archived e-book can be provided additional archival indicia 353 (e.g., by the memory management module 120). When the entry 326 is rendered in the one of the lists, the indicia can communicate that the user needs to "tap to download" the e-book. If the user taps the entry, the linked programmatic action 355 is initiated, which retrieves the e-book from the network service 120. For example, the memory management module 320 may signal via the service interface 340 to procure the specific archived e-book. This functionality enables the user to view the entire e-book library, while selectively archiving e-book titles in a manner that enables the e-book title to be instantly available if requested.

In some variations, the memory management module 320 signals an archival action 347 to the network service 120 via the service interface 340. The archival action 347 can identify the particular e-book that was identified by the archive input 311. In response to the memory operation 333, the network service 120 can mark the particular e-book that is being archived, and communicate the archival status of that particular e-book to other devices associated with the account.

Methodology

Figure 4:
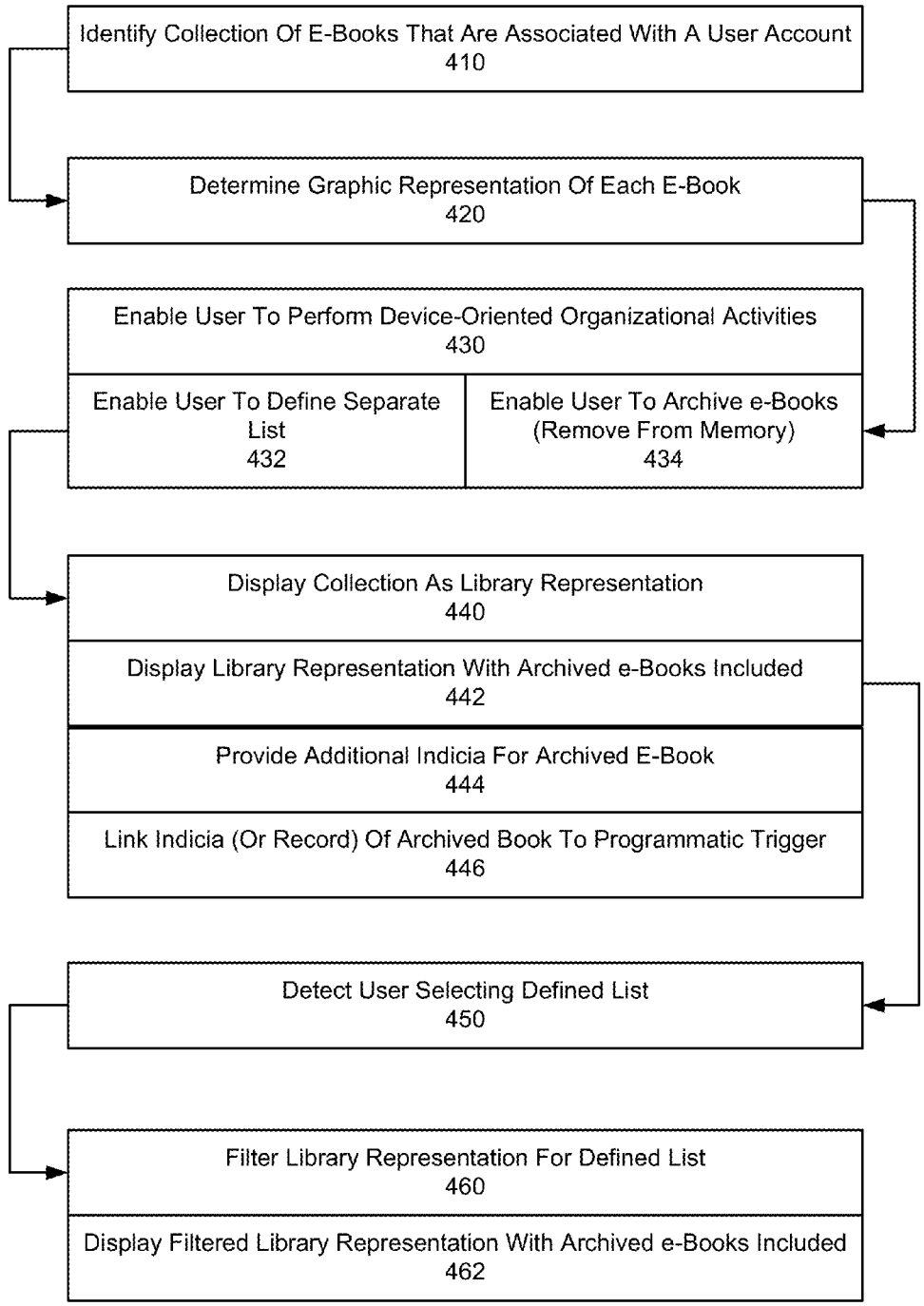
FIG. 4 illustrates an example method for presenting list content for a collection of e-books associated with the user account on a mobile computing device.
Figure 5:
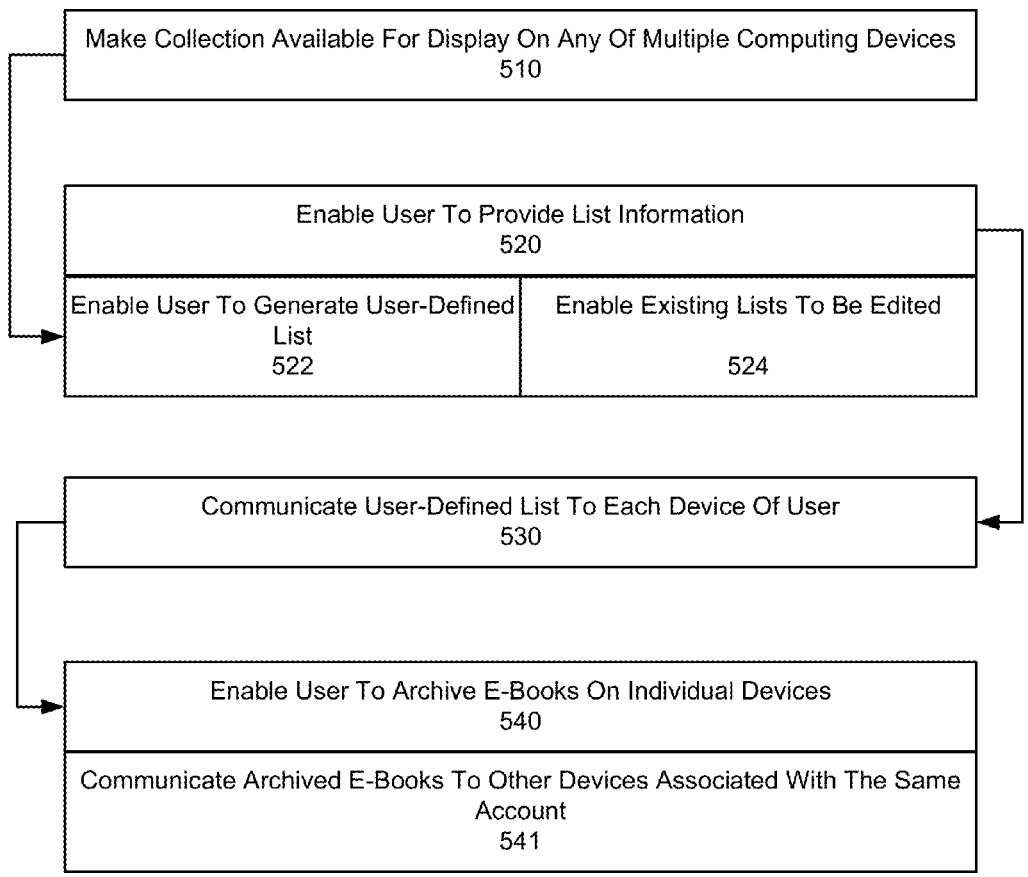
FIG. 5 illustrates an example method for enabling the user to organize a collection of e-books using user-defined lists.

FIG. 4 illustrates an example method for presenting list content for a collection of e-books associated with the user account on a mobile computing device. FIG. 5 illustrates an example method for enabling the user to organize a collection of e-books using user-defined lists. Examples such as described by FIG. 4 or FIG. 5 may be implemented using components such as described with FIG. 1, FIG. 2, or FIG. 3. Accordingly, reference may be made to elements of other figures for purpose of illustrating suitable elements or components for performing a step or sub-step being described.

With reference to FIG. 4, a collection of e-books that are associated with an account of the user are identified on a given computing device (410). For example, the user can register for an account with an e-book service. Alternatively, the user can use an e-book service application of the mobile computing device to provide login and password information, and the device can subsequently use the information to login to the network service 120 on behalf of the user via the service interface 340. With use of the account, the user can purchase e-books and over time develop a collection of e-books. Furthermore, the user can utilize multiple devices for a given account, so that purchases made on one device can be downloaded on other devices. Over time, the e-books that comprise the user collection are identified on each device.

Each e-book in the collection may also be associated with a graphic representation (420). The graphic representation may originate, for example, from the publisher source. For example, the graphic representation can correspond to the imagery provided by a publisher source used to market the e-book. In variations, the graphic representation can correspond to imagery used by a publisher source to market a hard copy of the same literary work. In one implementation, the graphic representation can be in the form of an icon. Alternatively, the graphic representation can represent the jacket or binder of the literary work. For example, an e-book may be provided a graphic book jacket that corresponds to the hardbound edition of the same literary work. The graphic book jacket can include, for example, one or more of a front cover, an inside jacket, a spine illustration, and/or back cover.

A suitably configured computing device can be configured to enable the user to perform device-oriented organizational activities (430). Among such activities, the user can define one or more lists (432). For example, the user can define a list of favorite e-books, e-books that are associated with the particular user of the mobile computing device, e-books that are pertinent to a particular topic that the user is interested in, or e-books that are saved for later reading. Each list can include a name and one or more entries corresponding to e-books of the user. Furthermore, individual entries can comprise entries for multiple lists.

As an addition or alternative, the user can archive e-books (434). When archived, the user deletes the content portion of the e-book from local memory. However, the user's account notes the e-book belongs to the user, and enables the user to download the e-book at a later date. In this way, for example, the user can manually or automatically trigger archival of an e-book when, for example, the user has completed reading the e-book.

The user can operate the computing device to display the user's collection of e-books in the form of a library representation (440). The library representation can correspond to, or be comprised of various lists that are maintained for the particular account of the user. According to examples described herein, the library representation can include both locally stored e-books and those e-books that are archived (442). In one implementation, each e-book of the user's account is provided a record that includes (i) e-book metadata, including title, author, graphic representations or imagery, reviews etc., and (ii) content. When archived, the portion of the e-book that corresponds to the content can be removed from the local memory of the device. The record itself may remain on the device, so that data such as the graphic representation of the archive e-book can be used to represent that e-book in one or more of the lists that comprise the library representation of the user's collection.

Furthermore, when an archived e-book is displayed in the library representation, the graphic representation of that e-book can be altered, or otherwise provided additional indicia to indicate that the e-book has been archived (444). As an alternative to indicia, the e-book with the archived status can be provided a relative position or orientation, such as with respect to a midline, or oriented sideways versus by spine. Furthermore, the indicia or record of archived book may be linked to a programmatic trigger that can be selected by the user in order to have that e-book downloaded once again on the computing device (446). For example, the user may tap the entry of an archived e-book in order to initiate a download of that e-book.

According to some examples, the user can elect to view only a portion of the user's collection corresponding to, for example a user-defined list (450). For example, the user may select to view one of the user defined list by entering selection input through interaction with the user interface 310.

In response to the user selecting to view a user-defined list, the library representation may be filtered to include entries for e-books that are specified by the selected list (460). For example, the entries of a user-defined list may be provided in a vertically scrollable manner, or as part of a bookshelf in which other shelves are graphically hidden or made less of focus (e.g., the selected shelf is made the center of the screen while other shelves or move the side).

When the user selects a user-defined list, those e-books of the list which are archived may also be identified in the list in the manner described (462). For example, archived e-books in a user-defined list can be provided indicia indicating the archive status of the book, as well as the programmatic link by which the user can trigger an automatic download of the contents of the book.

With reference to FIG. 5, network service 120 can be operated in a manner that enables a user's collection of e-books to be made available for use on any of multiple computing devices of the user (510). For example, the network service 120 can maintain account information for each user, and the account information can identify each e-book in the given user's collection. Furthermore, the account information can identify lists of the user (including user-defined lists), as well as those e-books which have been archived on any of the users computing devices.

The service can further enable functionality that enables the user to create user-defined lists on any of multiple user devices associated with the particular user account. For example, the service can be linked to an application or other programmatic resource on each of the user's computing devices. The various applications can be implemented on different computing environments, such as different operating systems. The user can operate each application in order to access the network service 120 through any one of the user's devices. In one implementation, the user can operate the application on any of the users associated computing devices in order to obtain functionality corresponding to user interface 310.

In one implementation, the user can interact with the user interface 310 for purpose of specifying list information for their e-book collection (520). The list information can include newly created lists (522) and edits to existing lists (524).

The list information can be received by the network service 120 from any computing device associated with the user account, and then communicated to the other computing devices that are associated with the same account (530). For example, the user can specify a new list, and the service 120 can communicate the new list to other computing devices of the user. Alternatively, the user can edit or update an existing list (e.g., add an entry to an existing list), and the edit to the list can be communicated to the other computing devices associated with the user's account.

Additionally, the user can elect to archive an e-book on a given computing device associated with the user's account (540). When the user archives an e-book on one computing device, the network service 120 can automatically communicate the archive status of the e-book to other computing devices of the same account (541). In turn, the other computing devices can remove the content of the e-book from their respective memory, while maintaining the record and graphic representation for the e-book.

EXAMPLES

FIG. 6A through FIG. 6E illustrate various examples of interfaces for providing graphic representations of an e-book collection based on list content. Examples such as provided with FIG. 6A through FIG. 6E may be implemented using embodiments such as described with FIG. 1 through FIG. 5. For purpose of description, references made to elements of FIG. 1 and FIG. 3 is to illustrate content and components for implementing interfaces and functionality such as described.

FIG. 6A illustrates an example interface for displaying a library representation for a user's collection of e-books. An interface 601 displays a library representation, corresponding to a user's entire e-book collection with network service 120. In an example shown, the library representation can be displayed in the form of a list 610 that the user can vertically scroll downward using scroll features 618. Individual entries 612 in the list correspond to e-books that the user owns, or alternatively has rights to view or download. Each entry 612 can include a graphic representation 613 of the corresponding e-book, as well as other information, such as the title of the book, author, rating, genre or other information (for simplicity, not shown).

Furthermore, select e-books 614 in the collection can be archived, so as to not be locally stored. The archived e-books 614 can be provided with additional indicia 615 that indicates the archive status of the e-book. Furthermore, the indicia 615 can be linked to a programmatic action or process (e.g., download specific title of entry) for purpose of enabling the user to seamlessly download the archived e-book.

FIG. 6B illustrates an interface for enabling the user to create a new user-defined list. In an example of FIG. 6B, interface 621 includes a feature 622 for enabling the user to define a new user-defined list. The user can define a new list by providing the list with a label, and then specifying one or more local and/or archived e-books to include in the list. In some variations, the various lists, such as user-defined lists, can be represented as shelves in a bookcase. The interface 621 can also identify other user-defined lists, created on either the computing device, or on another computing device. As another variation, the user-defined lists can be created by the user directly interfacing with the network service 120.

FIG. 6C illustrates an interface for enabling the user to specify entries for a newly created list. When the user creates a new list, an interface 631 enables the user to browse e-books in his or her collection for purpose of identifying specific e-books for the collection. A selection mechanism 633 can be provided to enable the user to select an e-book for a given list. The user can browse from his or her entire collection of e-books in making selections for the particular the particular list. In an example of FIG. 6C, the user can select both locally stored e-books 635 and archived e-books 637 for a given user-defined list.

FIG. 6D illustrates an interface for enabling the user to view list content for a newly user-defined list. An interface 641 displays list content corresponding to a user-defined list 640. The user-defined list 640 includes a list name 642, with each entry of the list corresponding to an e-book that the user has identified for the particular list. The entries for the user-defined list can include both locally stored e-books 644 and archived e-books (e.g., stored with network service 120 and not on the device). Each entry can display a graphic representation 647 of the individual e-books in the user-defined list. Additionally, other information associated with the records of the e-books can be displayed. Such additional information can include the title, author, rating, genre or other descriptive information associated with the individual e-books.

Figure 6E:
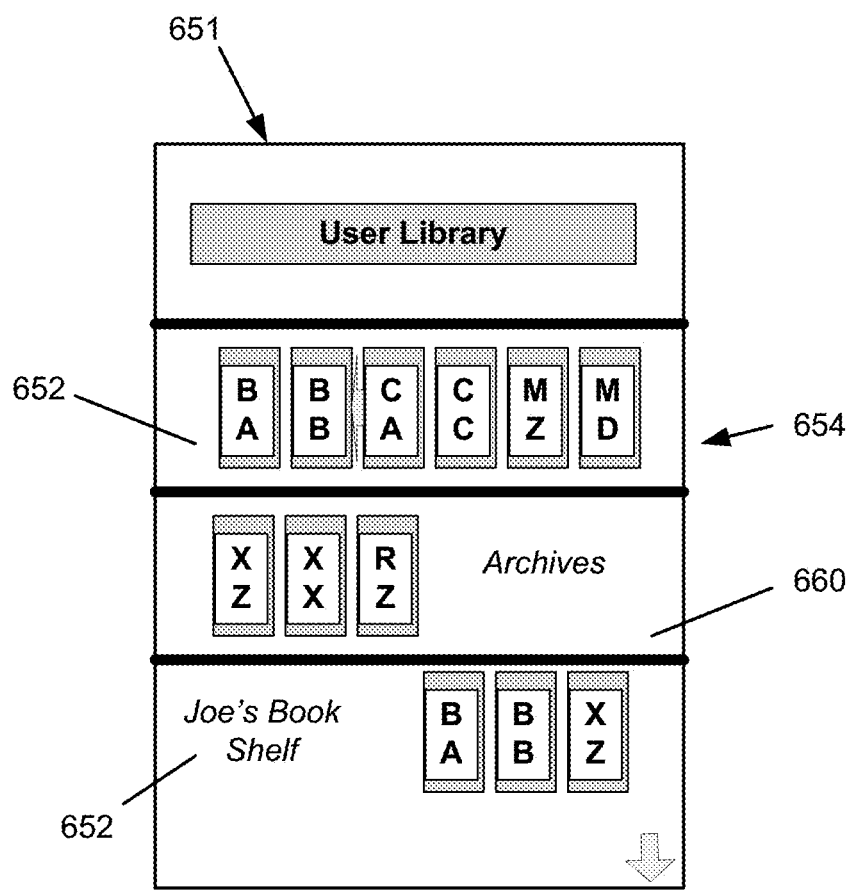
FIG. 6E illustrates an interface for displaying list content in the form of a bookcase and/or bookshelf

FIG. 6E illustrates an interface 651 for displaying list content in the form of a bookcase and/or bookshelf. Various graphic representations can be used to display both individual lists and the user's collection as a whole. In one implementation, for example, each list can represent a shelf 652 on a bookcase 654, and the user's collection of e-books as a whole can be represented by the bookcase. When the user creates a new user-defined list, the user-defined list can be provided as a new shelf in the bookcase. The bookshelf 652 can display graphic representations of each e-book in the corresponding list. In one implementation, each e-book is represented iconically. In a variation such as shown, the graphic representation 656 of some or all e-books is from the perspective of its spine, so as to mimic a real life bookshelf. In such an implementation, the graphic representation for each e-book may be selected or otherwise formatted so that it has the shape or form of a book spine. For example, the publisher's resource can be accessed to determine actual imagery used to market a hard back version of the same literary work, and that imagery may be used as a graphic representation when displaying an e-book by its spine.

In a variation such as shown by FIG. 6E, an archive list 660 can be provided its own shelf. Items in the archive list can also be included in other lists/shelves. The entire user library can be displayed as a bookshelf 652 where each shelf is its own list, and the bookcase can be scrolled up or down to view list content corresponding to the entries of the various lists.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for organizing e-books on a computing device, the method comprising:
    identifying a collection of e-books that are associated with the computing device, including multiple e-books that are stored in a local memory of the computing device and the local memory of multiple, other computing devices associated with the same account as the computing device;
    identifying a graphic representation of each e-book in the collection;
    identifying a user-defined list of e-books from the collection;
    displaying a library representation of the collection, the library representation including the graphic representation of each e-book in the collection;
    enabling the user to specify an input that corresponds to the user-defined list;
    in response to detecting the input, filtering the library representation to include only the e-books that are part of the corresponding user-defined list;
    archiving a selected e-book from the multiple e-books of the collection by (i) removing the selected e-book from local memory, and (ii) performing archiving functions to archive the selected e-book from the multiple, other computing devices of the user, including to remove the selected e-book from a local memory of each of the multiple, other devices; and
    for each archived e-book, altering the graphic representation of the e-book in the library representation to indicate that the e-book is archived with respect to that computing device.

2. The method of claim 1, further comprising enabling the user to create the user-defined list, and to include one or more archived e-books in the user defined list.

3. The method of claim 2, further comprising displaying the user-defined list to include a first set of graphic representations and a second set of graphic representations, each graphic representation of the first set corresponding to an e-book that is locally stored on that computing device, and each graphic representation of the second set corresponding to an e-book that is archived on that computing device.

4. The method of claim 1, further comprising signaling the user-defined list to a service which associates the user-defined list with an account of the user.

5. The method of claim 1, wherein altering the graphic representation of the e-book includes altering a shading, a coloring or a portion of a content of that graphic representation.

6. The method of claim 1, wherein altering the graphic representation of the e-book includes altering a position of the graphic representation within the library representation.

7. The method of claim 1, wherein identifying the graphic representation of each e-book in the collection includes:
    determining, for each e-book, imagery used to package a media on which that e-book is provided from a corresponding publishing source; and
    for each of the multiple e-books, generating a graphic representation that replicates the imagery of that e-book.

8. The method of claim 7, wherein determining the imagery includes determining a jacket cover used to package a book corresponding to each of the multiple e-books.

9. The method of claim 8, wherein determining the jacket cover includes accessing, for the literary work corresponding to each e-book, a publisher resource in order to determine the jacket cover for a book that carries literary work.

10. A method for organizing e-books of a user, the method comprising:
    identifying a collection of e-books that are associated with the computing device, including multiple e-books that are stored in a local memory of the computing device and the local memory of multiple, other computing devices associated with the same account as the computing device;
    identifying a graphic representation of each e-book in the collection;
    identifying a user-defined list of e-books from the collection;

displaying a library representation of the collection, the library representation including the graphic representation of each e-book in the collection;

enabling the user to specify an input that corresponds to the user-defined list;

in response to detecting the input, filtering the library representation to include only the e-books that are part of the corresponding user-defined list;

archiving a selected e-book from the multiple e-books of the collection by (i) removing the selected e-book from local memory, and (ii) performing archiving functions to archive the selected e-book from the multiple, other computing devices of the user, including to remove the selected e-book from a local memory of each of the multiple, other devices; and for each archived e-book, altering the graphic representation of the e-book in the library representation to indicate that the e-book is archived with respect to that computing device.

11. The method of claim 10, further comprising:

enabling the collection of e-books to be displayed as a library representation, the library representation including the graphic representation of each e-book in the collection; and enabling each user-defined list to be displayed as a filtered version of the library representation that includes the graphic representation of each e-book in the user-defined list.

12. The method of claim 11, further comprising altering the graphic representation of each e-book in the user-defined list that is archived to communicate that the e-book is not locally stored, but available through a cloud service.

13. The method of claim 11, wherein enabling an appearance of the user-defined list to differ on each of the multiple computing devices based on the e-books of the user-defined list that are archived on individual computing devices of the user.

14. A non-transitory computer-readable medium that stores instructions for managing e-books on a computing device, the computer-readable medium including instructions that, when executed by one or more processors, cause the one or more processors to perform operations comprising:

identifying a collection of e-books that are associated with the computing device, including multiple e-books that are stored in a local memory of the computing device and the local memory of multiple, other computing devices associated with the same account as the computing device;

identifying a graphic representation of each e-book in the collection;

identifying a user-defined list of e-books from the collection;

displaying a library representation of the collection, the library representation including the graphic representation of each e-book in the collection;

enabling the user to specify an input that corresponds to the user-defined list;

in response to detecting the input, filtering the library representation to include only the e-books that are part of the corresponding user-defined list;

archiving a selected e-book from the multiple e-books of the collection by (i) removing the selected e-book from local memory, and (ii) performing archiving functions to archive the selected e-book from the multiple, other computing devices of the user, including to remove the selected e-book from a local memory of each of the multiple, other devices; and for each archived e-book, altering the graphic representation of the e-book in the library representation to indicate that the e-book is archived with respect to that computing device.

15. The computer-readable medium of claim 14, further comprising instructions for enabling the user to create the user-defined list, and to include one or more archived e-books in the user defined list.

16. The computer-readable medium of claim 15, further comprising instructions for displaying the user-defined list to include a first set of graphic representations and a second set of graphic representations, each graphic representation of the first set corresponding to an e-book that is locally stored on that computing device, and each graphic representation of the second set corresponding to an e-book that is archived on that computing device.

17. The computer-readable medium of claim 14, further comprising instructions for signaling the user-defined list to a service which associates the user-defined list with an account of the user.

18. The computer-readable medium of claim 14, wherein the instructions for altering the graphic representation of the e-book includes instructions for altering a shading, a coloring or a portion of a content of that graphic representation.

19. The computer-readable medium of claim 14, wherein the instructions for altering the graphic representation of the e-book includes instructions for altering a position of the graphic representation within the library representation.

* * * * *